(12) United States Patent
Eldering

(10) Patent No.: US 6,615,039 B1
(45) Date of Patent: Sep. 2, 2003

(54) ADVERTISEMENT SUBGROUPS FOR DIGITAL STREAMS

(75) Inventor: Charles A. Eldering, Doylestown, PA (US)

(73) Assignee: Expanse Networks, Inc, Pipersville, PA (US)

(*) Notice: Subject to any disclaimer, the term of this patent is extended or adjusted under 35 U.S.C. 154(b) by 0 days.

(21) Appl. No.: 09/568,477

(22) Filed: May 10, 2000

Related U.S. Application Data

(60) Provisional application No. 60/133,398, filed on May 10, 1999.

(51) Int. Cl.[7] .......................... H04M 3/42; H04M 3/00
(52) U.S. Cl. ...................... 455/418; 455/414; 725/42
(58) Field of Search ................. 455/418, 406, 455/414, 403, 419; 705/14, 26, 1; 709/224, 223; 725/42–45, 104, 70

(56) References Cited

U.S. PATENT DOCUMENTS

| | | | |
|---|---|---|---|
| 5,231,494 A | * 7/1993 | Wachob | 348/385.1 |
| 5,319,455 A | 6/1994 | Hoarty et al. | 348/7 |
| 5,400,166 A | 3/1995 | Huber | 359/173 |
| 5,457,562 A | 10/1995 | Tremblay | 359/188 |
| 5,574,860 A | * 11/1996 | Perlman et al. | 340/5.74 |
| 5,585,858 A | 12/1996 | Harper et al. | 348/485 |
| 5,600,364 A | 2/1997 | Hendricks et al. | 348/1 |
| 5,600,366 A | 2/1997 | Schulman | 348/9 |
| 5,612,742 A | 3/1997 | Krause et al. | 348/385 |
| 5,636,346 A | 6/1997 | Saxe | 395/201 |
| 5,652,615 A | * 7/1997 | Bryant et al. | 725/35 |
| 5,761,601 A | 6/1998 | Nemirofsky et al. | 455/3.1 |
| 5,774,170 A | * 6/1998 | Hite et al. | 725/34 |
| 5,926,205 A | 7/1999 | Krause et al. | 348/7 |
| 5,931,901 A | * 8/1999 | Wolfe et al. | 709/206 |
| 5,966,120 A | 10/1999 | Arazi et al. | 345/327 |
| 6,006,257 A | * 12/1999 | Slezak | 725/110 |
| 6,026,369 A | 2/2000 | Capek | 705/14 |
| 6,055,510 A | * 4/2000 | Henrick et al. | 705/1 |
| 6,359,902 B1 | * 3/2002 | Putzolu | 370/466 |
| 2002/0188943 A1 | * 12/2002 | Freeman et al. | 725/38 |

FOREIGN PATENT DOCUMENTS

| | | | |
|---|---|---|---|
| EP | 1220542 A1 | * 3/2002 | H04N/7/173 |
| WO | 9712486 | 4/1997 | |
| WO | 9717774 | 5/1997 | |
| WO | 9952285 | 10/1999 | |
| WO | 0064166 | 10/2000 | |
| WO | 0069163 | 11/2000 | |

OTHER PUBLICATIONS

IMIGIS Homepage publication "Ad Force, Ad Management Services", Jun. 1998, 3 pages.
Accipiter Homepage publication "Accipiter Ad Manager 2.0, features and benefits", Jul. 1998, 7 pages.
U.S. patent application Ser. No. 09/568,084, Eldering, filed May 2000.
NCTA Technical Papers "Compressed Digital Commercial Insertion: New Technology Architectures for the Cable Advertising Business" 1992 8 pages.
AdLink Engineering, Ad insertion wiring diagrams, 1999, 17 pages.

* cited by examiner

Primary Examiner—Nay Maung
Assistant Examiner—Edan Orgad
(74) Attorney, Agent, or Firm—Douglas J Ryder

(57) ABSTRACT

A targeted advertising system based on subgroups. Different subgroups are formed based on one or more subscriber characteristics, and different targeted advertisements transmitted to the different subgroups. In the Internet-environment, the subgroups are formed by utilizing multicast addresses. In cable-based and satellite-based systems, the subgroups are formed by node configurations. The targeted advertisements may be transmitted simultaneously with programming and inserted locally. An apparatus is presented which receives m program streams, n advertisements, and creates p presentation streams containing targeted advertisements, where p is greater than m.

38 Claims, 9 Drawing Sheets

| PID | INSERT TIME | PS ID/ NODE ID | AD ID |
|---|---|---|---|
| 357123 | 08:32:29 | 1 | 3 |
| 327112 | 14:57:12 | 2 | 4 |
| ⋮ | ⋮ | ⋮ | ⋮ |
| 367152 | 24:12:33 | 8 | 10 |

*FIG. 9*

| SUBSCRIBER IP ADDRESSES | PROGRAM MULTICAST ADDRESSES | AD MULTICAST ADDRESSES |
|---|---|---|
| 128.10.2.2 | 224.10.12.2 | 231.15.12.7 |
| 128.15.22.712 | 225.10.15.7 | 230.100.107.6 |
| ⋮ | ⋮ | ⋮ |
| 128.14.12.5 | 225.10.12.8 | 230.12.18.9 |

*FIG. 10*

ADVERTISEMENT SUBGROUPS FOR DIGITAL STREAMS

This application claims the priority under 35 U.S.C. §119 of U. S. Provisional Application 60/133,398 filed on May 10, 1999. Application 60/133,398 is herein incorporated by reference, but is not admitted to be prior art.

BACKGROUND OF THE INVENTION

The development of compression and transmission techniques for digital video and audio signals coupled with the advent of the Internet have resulted in an ability to transmit audio and video programming to subscribers from a multitude of locations. Reception areas are no longer limited to the reception area of a radio or television transmitting tower, a cable TV head end, a telephone central office or another geographically determined location. Instead, the subscribers of programming may be distributed over a wide geographical range and, in fact, exist in a multitude of countries.

For example, a group of subscribers distributed across the globe having a specific interest can have simultaneous access to the programming of interest. In cable television systems, these programs are generally transmitted to groups of subscribers, each group being associated with a node. A node is traditionally associated with a receiver which receives an optical signal from the cable TV head end, converts the signal to an electrical signal, and transmits the signals to the homes. The video programming is frequently transmitted from one central location to multiple cable television head ends, and then distributed to the nodes and ultimately to the subscribers. Although the viewership for the programs transmitted in this manner may be quite large, generally, there exists characteristics that can be associated with each node due to the respective geographic location.

The nodes in certain areas may have subscribers with a particular range of household income or other demographic characteristics that are distinct from the subscribers in other nodes both nearby and distant.

Similar characteristics exist for the television systems that receive digital programming from satellites. Generally, the digital video programming is frequently transmitted from one central location to multiple cable television head ends, and then distributed to the nodes and ultimately to the subscribers.

The transmission of the programming based on specific geographic areas continues to exist, especially in cable-based systems and satellite-based systems, but is substantially affected by the advent of the Internet. In the Internet environment, the information contents may be received from any computer on the network, irrespective of where the subscriber is located. Furthermore, in the Internet environment, the information contents may be customized based on subscriber needs and preferences.

In all of the above-mentioned systems, including cable-based, satellite-based and Internet-based systems, the program contents also include one or more advertisements. These advertisements are generally inserted in the program streams by evaluating the program contents, making a rough determination of the target audience, and finding suitable advertisements. For example, beer advertisements may be inserted into the football game programming, and gardening tools advertisements may be inserted into home improvement programming. In cable-based and satellite-based systems, these advertisements are generally displayed as spot messages, and in the Internet environment, these advertisements are displayed as banner advertisements.

Internet environments also provide for multicasting where audio and video streams are simultaneously transmitted to a plurality of subscribers. The subscribers are grouped based on the type of program contents they receive, but there is no distinction for the purpose of advertising.

Thus even though prior art advertising schemes try to match the program contents and the advertisements that are displayed within the program contents, such advertisement schemes are not fully effective. What is lacking in these advertising schemes is the idea of targeted advertising, i.e., presenting different advertisements to different subscribers based on one or more subscriber characteristics, or different versions of the same advertisement to different subscribers based on one or more subscriber characteristics.

SUMMARY OF THE INVENTION

The present invention is directed at an apparatus and a method for creating subgroups based on one or more subscriber characteristics. Each subgroup corresponds to one or more subscribers and receives a particular program stream and one or more targeted advertisements directed at that set of subscribers.

The subgroups may be created in many different ways. In an Internet environment, the subgroups may be created by utilizing multicasting features. Generally, the subgroups are created within a multicast group based on one or more shared subscriber characteristics. The subgroup may comprise a group of subscribers, a group of households, an individual subscriber or a single household. In a cable environment, the subgroups may be created based on the configuration of a regional end and one or more local ends, e.g., each node configured to a local end may represent a subgroup.

In one embodiment, an apparatus is presented in which n digital program streams are received along with m digital advertisement streams, and p digital presentation streams are created, where p is greater than n. Each of the digital presentation streams corresponds to a different subgroup, e.g., a first presentation is transmitted to a first subgroup, and a second presentation is transmitted to a second subgroup, etc.

In one implementation, different presentation streams are formed for different subgroups created within a multicast group.

The targeted advertisements may be transported along with a program stream as a separate advertising stream. This may be accomplished in many different ways, e.g., in an Internet environment, this may be accomplished by forming a program multicast stream which contains an entertainment stream, and forming a plurality of advertisement multicast streams that contain one or more targeted advertisements. The program multicast stream is transmitted to a group of subscribers (comprising many subgroups), while a first advertising multicast stream is transmitted to a first subgroup of the group. Similarly, the programming multicast stream and a second advertising multicast stream is transmitted to a second subgroup. In this embodiment, the targeted advertisements are inserted into the programming multicast stream at the appropriate insertion time.

The present invention also presents a method of receiving targeted advertisements where a first digital signal containing programming is received along with a second digital signal containing target advertisements which is inserted into the first signal at the appropriate advertisement breaks and presented to the subscriber. The program streams may contain default/generic advertisements that may be substituted with target advertisements. Alternatively, the program streams may contain empty segments where target advertisements may be inserted.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIG. 9 illustrates an ad insertion table for MPEG streams with program IDs and ad IDs; and FIG. 10 illustrates a multicast ad insertion table.

DETAILED DESCRIPTION OF THE PREFERRED EMBODIMENT

Figure 1:
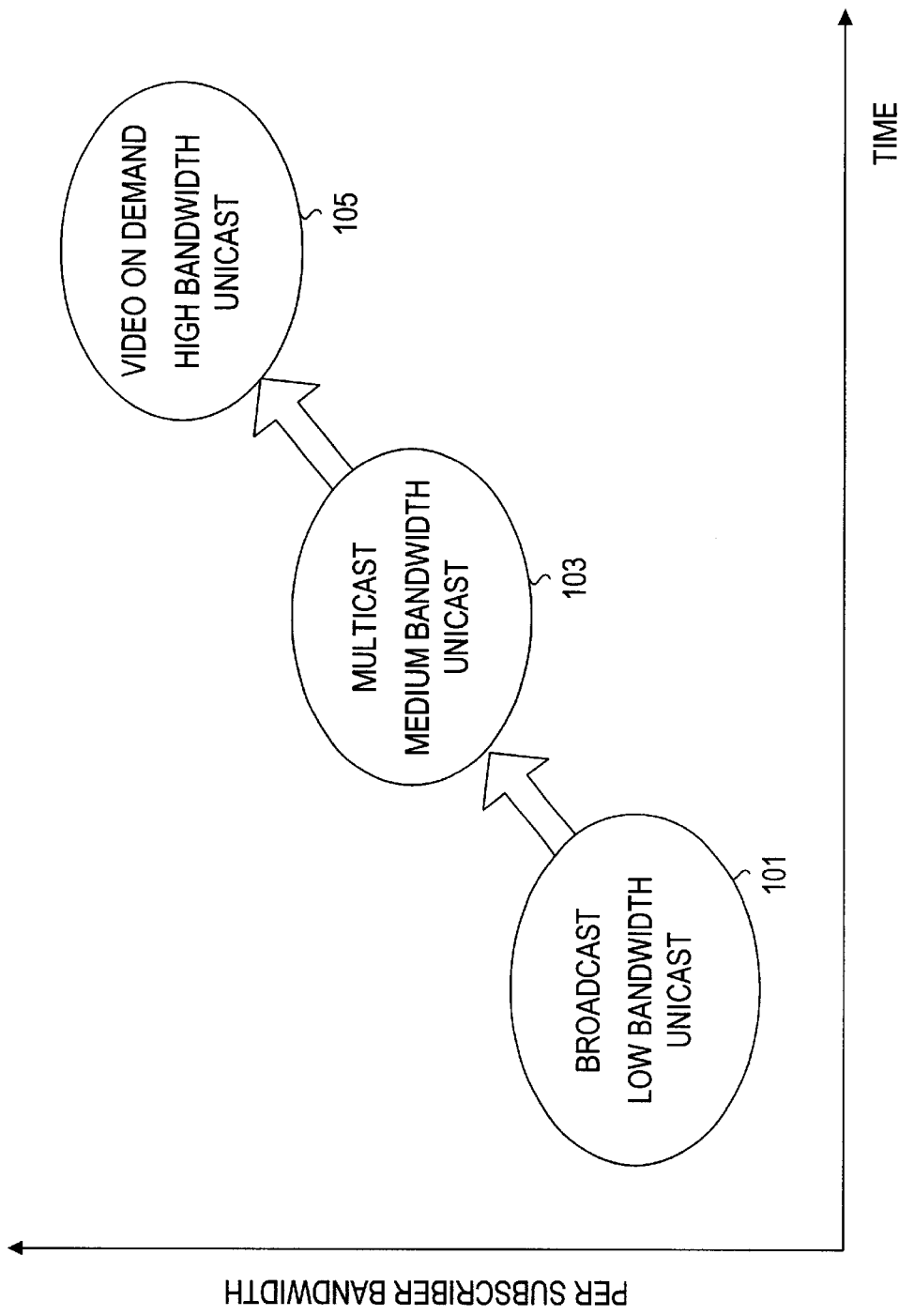
FIG. 1 illustrates the migration from broadcast and low bandwidth unicast services to multicast and high bandwidth services.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 10 in particular, the method and apparatus of the present invention is disclosed.

As illustrated in FIG. 1, the broadcast entertainment and telecommunications services are migrating from the classifications of broadcast programming and low bandwidth unicast 101 transmission to multicast and medium bandwidth unicast 103 systems in which the number of subscribers in the receiving group is reduced, or the bandwidth to a subscriber receiving an individualized service is increased. This migration is present in traditional television broadcasting as well as Internet access environments.

The increased availability of bandwidth to subscribers results in the formation of smaller broadcasting groups that can be referred to as multicast groups. In addition, the amount of bandwidth available to each subscriber for unicast services such as connections to Web sites, high-speed point-to-point data connections, and videoconferencing, is increased. This results in medium bandwidth unicast connections that can support new services.

The increased bandwidth also enables video on demand services that are essentially high bandwidth unicast (illustrated as 105 in FIG. 1) connections providing a subscriber with specific programming at a specific point in the program stream.

In accordance with the principles of the present invention, a number of new services may also be provided based on these unicast connections. One of these services is the relay of targeted advertisements.

In one embodiment of the present invention, the targeted advertisements are relayed based on subgroups, wherein each subgroup may comprise one or more subscribers, or one or more households. The method and system for creating subgroups is applicable for both the television broadcasting (video transmission) environment and the Internet environment, and may be realized in traditional networks.

Figure 2:
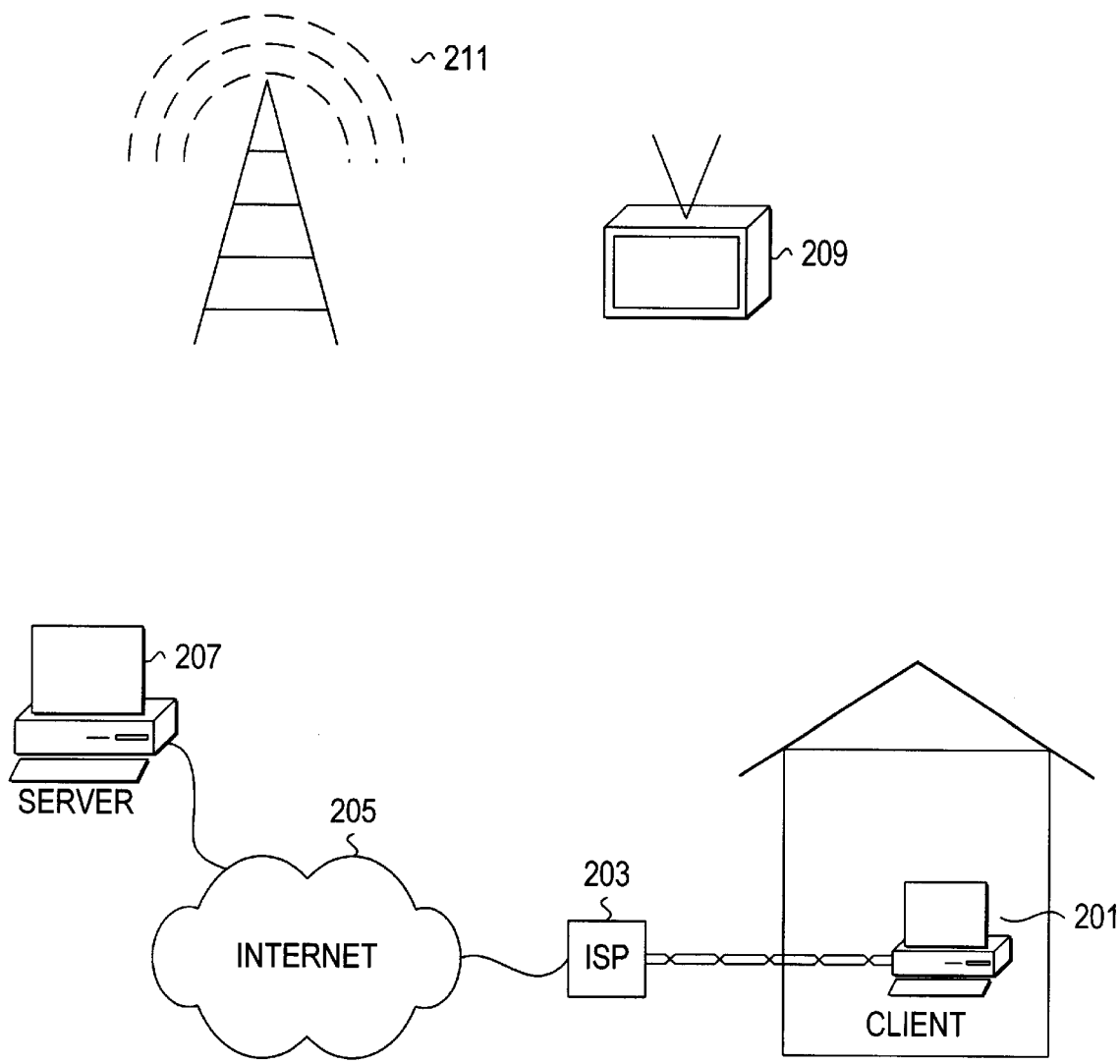
FIG. 2 illustrates current broadcast services and dial-up Internet access.

FIG. 2 illustrates exemplary illustrations for traditional television broadcasting and Internet access environments. The present broadcast audio and video entertainment services fall in the category of broadcast services that are delivered by traditional radio, cable TV and wireless broadcasting techniques wherein a client (receiver) 209 receives programming from a central unit 211. The central unit 211 may be a base-station or a head-end or a cable distribution point. In the Internet world, a web-server 207 broadcasts the information over an Internet network 205 to an Internet Service Provider (ISP) 203 which ultimately delivers the information to a client 201. The broadcasting is accomplished by utilizing one or more different multicasting protocols over the Internet.

The point-to-point connection for Internet access illustrated in FIG. 2 is also representative of unicast services that can be defined as the point-to-point transmission of signals from a source or a subscriber to another subscriber. This includes telephone service and point-to-point data connections to data sources.

In accordance with the principles of the present invention, the actual formation of subgroups for advertising is performed by creating multiple lists or tables of subscribers that share one or more subscriber characteristics. The subgroups may be based on (1) geographic segmentation, (2) demographic segmentation, (3) psychological segmentation, (4) psychographic segmentation, (5) sociocultural segmentation, (6) use-related segmentation, (7) use-situation segmentation, (8) benefit segmentation, and (9) hybrid segmentation. More information may be found in a book entitled Consumer Behavior, by Leon G. Schiffman and Leslie Lazar Kanuk published by Prentice Hall, New Jersey 1999.

The analysis of different segmentations permit the advertisement to be directed to specific users or groups of users who fit certain criteria. For instance, an advertisement for a baby stroller could reach parents of children under five years old—and only those individuals in that group. Other publicly or privately available data regarding the subscribers may also be collected. This data may also be mined to form a subgroup of subscribers which has a common characteristic which matches the characteristics of the target group.

One technique for forming subgroups involves utilization of geographic location information. Each subgroup may consist of subscribers located in a particular state, city, or associated with a cable television node. Another technique for forming subgroups is based on knowledge of the viewership of the actual programming. For example, many companies collect data related to the viewing of the television programming and such information may be used to form subgroups. One such collection of data is known as the Nielsen rating which is based on samples of information related to the viewing of television programming. Other types of similar information are also available. The subgroups may be based on the actual viewership information, or on an estimate of the current viewership, or on the statistical measurement of the viewership.

The actual formation of subgroups may be accomplished in many different ways. In an Internet environment, the subgroups may be formed by utilizing multicast addresses. Currently, the multicast addresses are utilized to form a group of subscribers that are interested in receiving the same information, e.g., listening to the same radio station, being members of some listserv, etc. In accordance with the principles of the present invention, the members of a multicast group may be further classified into subgroups (i.e., multicast subgroups). These subgroups may be formed based on geographic locations, e.g., country of residence, as can be determined from a subscriber e-mail address, IP address, or other Internet-related parameters. These subgroups may also be formed based on a subscriber's operating system, data transmission rate, or other transmission-related parameters. In this implementation, each subgroup may comprise a country, e.g., subscribers from the USA may be grouped in the first subgroup, and subscribers from Mexico may be grouped in the second subgroup. The formation of subgroups based on geographic information assists in selecting target advertisements that are suitable for each group.

Figure 3:
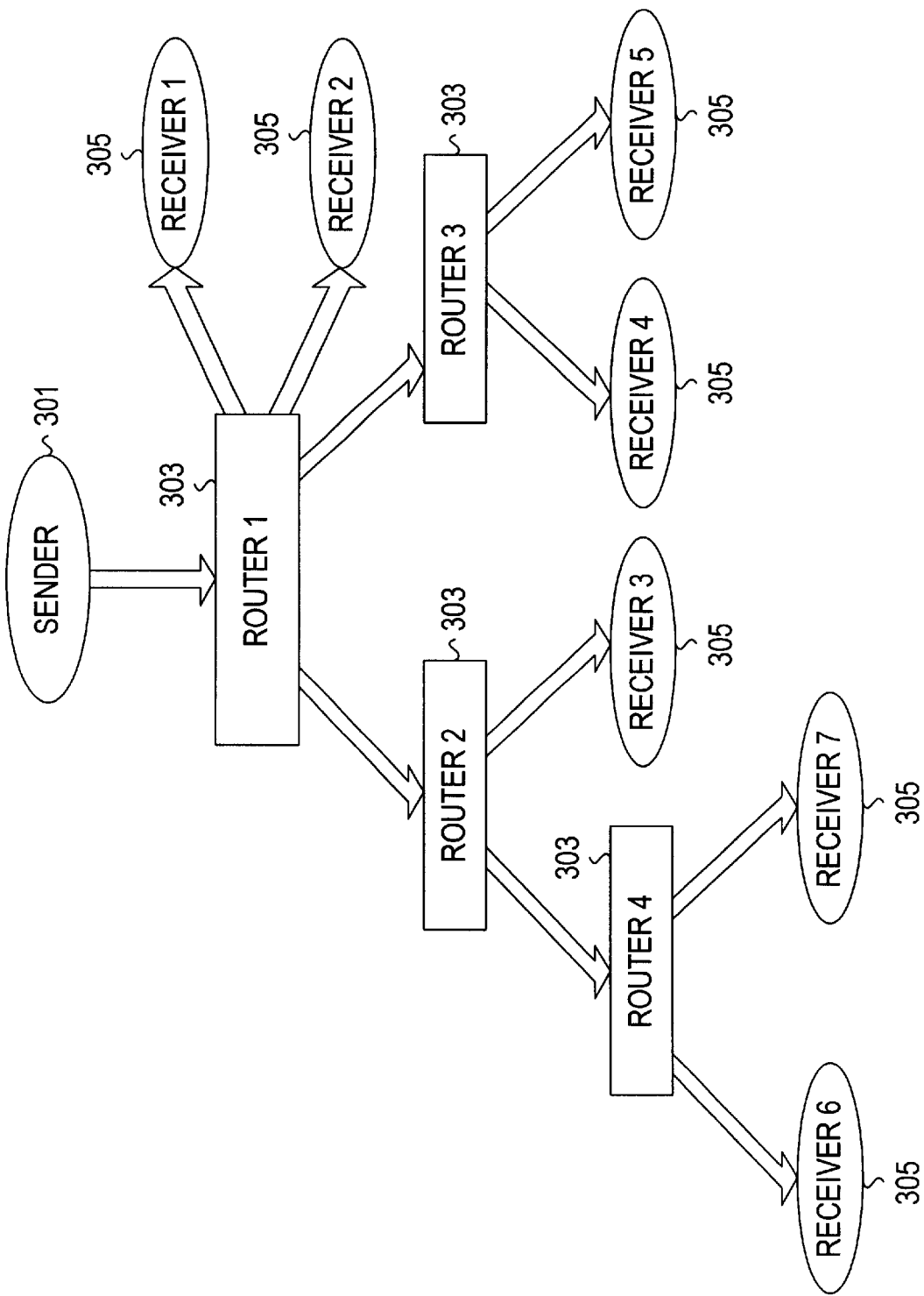
FIG. 3 illustrates the formation of multicast subgroups by utilizing different routers.

As shown in FIG. 3, in one embodiment, the multicast subgroups may be formed by utilizing different routers. In FIG. 3, the transmitter/provider of information (sender) 301 is directly connected to Router 1 303. The sender 301 may be a web-based server or a network-based server or other comparable means configured to distribute information to a plurality of receivers 305 via one or more routers 303. As shown in FIG. 3, Router 1 is directly coupled to the sender 301 and thereby forms a multicast group. Different receivers 305 belonging to the multicast group of Router 1 are further distributed in subgroups. Receiver 1 and Receiver 2 belong to a first subgroup served directly by Router 1. Receiver 3 is in a second subgroup served by Router 2. Receiver 4 and 5 are in a third subgroup and are served by Router 3. Receiver 6 and 7 are in a fourth subgroup and are served by Router 4.

Standard Internet multicasting protocols may be used to create these subgroups. Internet-based multicast protocols are well known to those skilled in the art and include Internet Group Management Protocol (IGMP) protocols and other Transmission Control Protocol/Internet Protocol (TCP/IP) related protocols. Some of these multicast protocols are described in the book entitled *Routing in the Internet* authored by Christian Huitema, and published by Prentice-Hall in 1995, and in the volumes 1 and 2 of the books entitled *Internetworking with TCP/IP*, authored by Douglas E. Comer and Douglas E. Comer and David L. Stevens respectively, published by Prentice-Hall in 1995 and 1999. The aforementioned books are incorporated herein by reference.

The Internet Engineering Task Force RFCs 1112, 1458, 1301 and 966 specify protocols for multicasting and are incorporated herein by reference.

Other multicasting techniques may also be used to create lists of subscribers that form part of one or more multicast groups. These groups may be subscribers in diverse locations receiving a program stream, or may be a group of subscribers belonging to the listserv.

Figure 4:
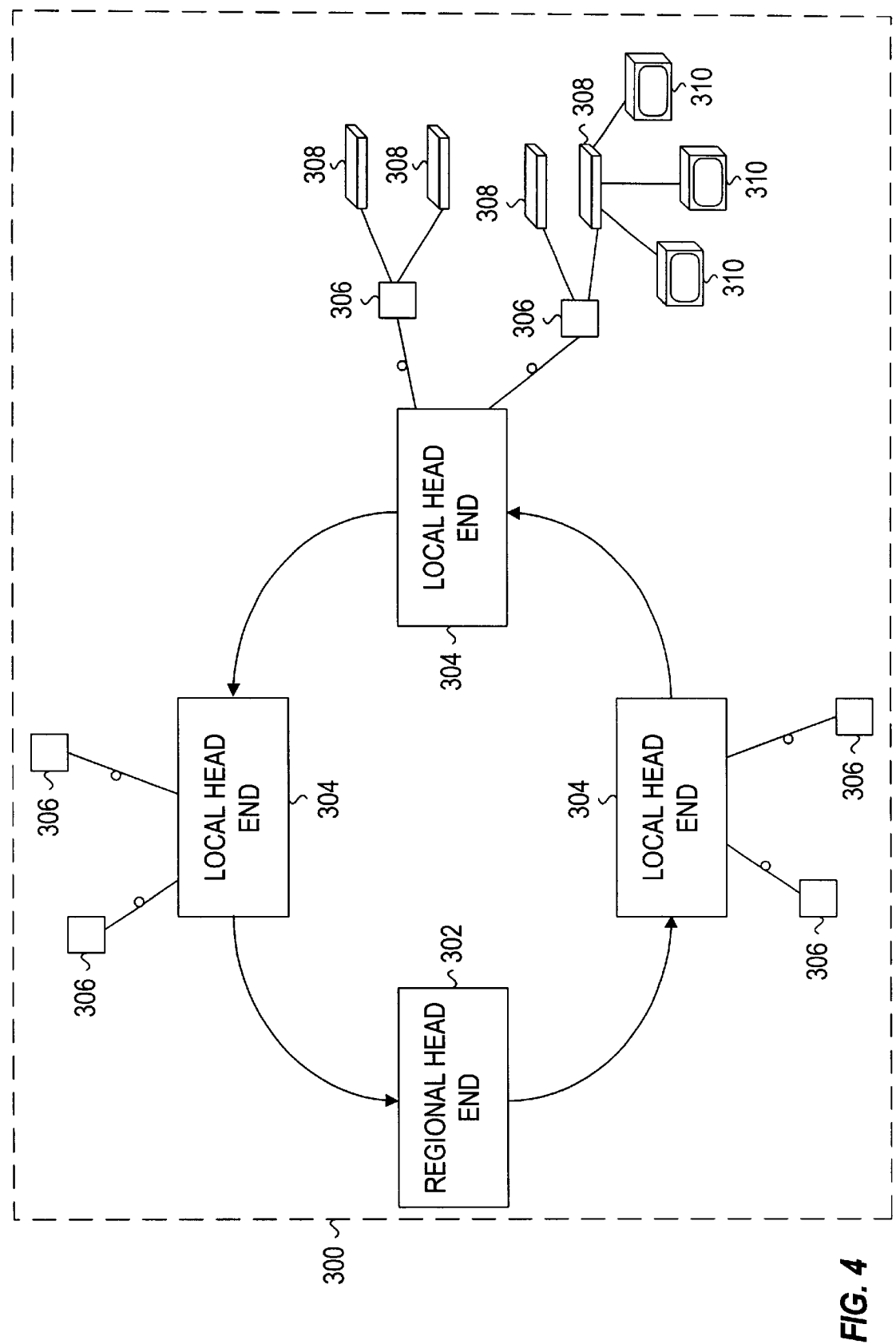
FIG. 4 illustrates an exemplary case of formation of multicast groups in a cable-based network.

In the cable systems and satellite-based systems, the subgroups may be created by utilizing the existing configuration of cable networks. As an example, in a cable television system, the subscribers associated with a node may be considered to form a subgroup. As illustrated in FIG. 4, in a traditional cable-based network 300, a regional head end 302 is coupled to one or more local ends 304. Each local end 304 serves one or more nodes 306. Each node 306 serves one or more set-tops 308, and each set-top 308 in turn may serve one or more television sets 310. In general, the viewers of the information transmitted by the television sets are the subscribers.

The subgroups may be formed utilizing the configuration of a local head end 304, or a node 306. The nodes are preferred because traditionally a local head end serves a large number of viewers/households, wherein a node serves only few households and thus may be used appropriately to form subgroups.

In a traditional cable-based system, a node 306 is configured to a plurality of set-tops 308 whereby the set-tops 308 receive transmission signals from the nodes 306. These transmission signals include programming contents as well as advertisements. Generally, the information is delivered via transmission signal to one or more set-tops 308 located within the household, and for tracking purposes, a set-top 308 represents a subscriber. However, in actual practice, a single set-top 308 may serve one or more television sets 310.

As described before, depending on the application and the desired size of the subgroups, the subgroups may be based on the local head end 304 or may be based on the nodes 306. Alternatively, the subgroups may be narrowed and may based upon the different set-tops 308, whereby a household represents a subgroup.

In the future, the subgroups will be further narrowed to the level of the television set 310 served from a single set-top 308. Thus, a single set-top 308 may represent a plurality of subscribers. In this case, different members of a household are different subscribers and the individual members of the household may be grouped in different subgroups for receiving different targeted advertisements. For example, the parents may receive a first target advertisement in their bedroom television, and the television in the children's bedroom may receive a second target advertisement (even though the parents and the children may be watching the same program).

The cable-based systems and satellite-based systems may further utilize cable modems, such as Data Over Cable Service Interface Specification (DOCSIS) modems, or other devices configured to communicate with the Internet. For example, set-top boxes having assigned IP addresses and using DOCSIS cable modems having different channels. The DOCSIS cable modems are discussed in detail at a later point in the specification.

In one embodiment, the advertisement streams (also referred as ad streams). are sent via a DOCSIS channel setup between a DOCSIS modem and a Cable Modem Termination System (CMTS) which relays all ad streams transmitted by the sender.

The sender obtains, from the CMTS, the IP address of the set-top box which integrates a DOCSIS modem and transmits the advertisements to that IP address through the CMTS. The IP address can be part of a multicast group or it can be a unicast address. The advertisment streams may be transmitted using Internet technologies such as streaming media or other real time protocols.

The subscriber information relating to the nodes may be further customized/modified. For example, the addresses of the homes served by the node may be used along with public records to determine the average price that was paid for the home. The public records that sufficiently provide this information include tax records and other real estate information, e.g., the real estate information that associates zip codes with the median house prices may be used to determine the median house price of households served by a node. Other demographic information that may be of interest includes the predominant language which is spoken by the subscribers in the node, the average household size for households served by the node, and the average disposable income of households served by the node.

The present node sizes in cable television systems range from 300 to 1,500 subscribers, but the node sizes are likely to decrease as more bandwidth is required per home. This will result in smaller nodes, each node being fed by a fiber-optic cable which transmits and receives signals from the head end. As node size is reduced the subgroup for advertising will also be reduced, thus permitting more directed advertisements.

One feature of the system is the ability to take n program streams and m advertisements (also referred as ads) and create p presentation streams with p being larger than n. This represents the fact that the initial program streams have been used in conjunction with the multicast subgroups to create presentation streams with ads that are specifically directed at subgroups.

Figure 5:
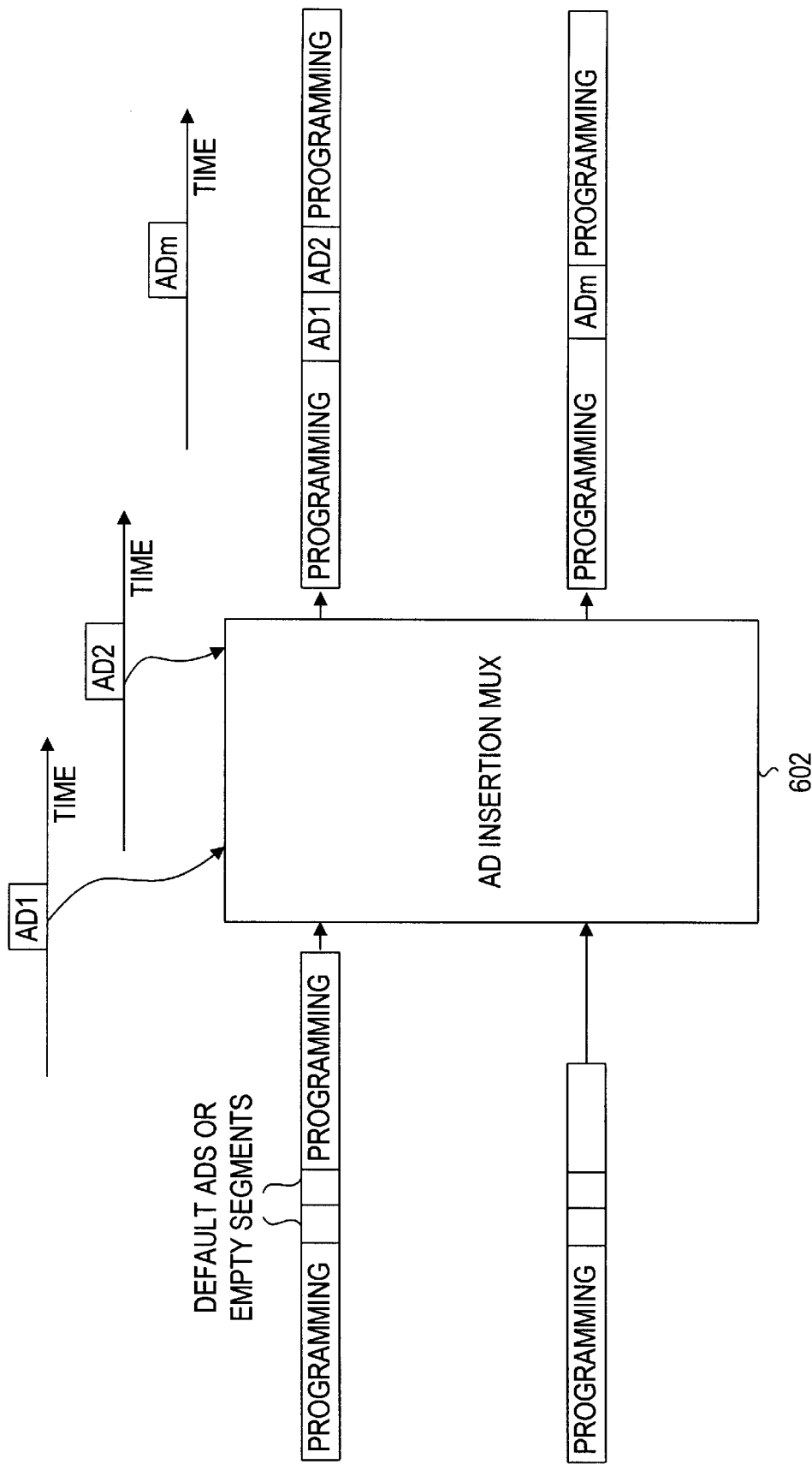
FIG. 5 illustrates time independent ad reception and insertion using an ad insertion multiplexer.

FIG. 5 illustrates the time independent feature of an advertisement insertion mux. This feature allows advertisements to be received at times not corresponding to the presentation times. The advertisements may be received shortly in advance of or well in advance of the insertion time, and may be stored in a temporary storage unit for insertion at a later time. As previously described, the advertisements may be received over a low bandwidth channel such that a 30 second advertisement is received in a period of minutes or even longer. The local digital storage unit such as a magnetic storage unit, a magneto-optic storage unit, or an optical storage unit allows insertion any time subsequent to the reception.

In an exemplary case, the programming may be received at digital data rates in the 27–155 Mb/s range. A fiber optic transmission system based on OC-3 transport rates or greater is used for the transport of digital video programming. The advertisements may be received over a lower data rate line, such as a T1 line operating at 1.5 Mb/s.

Figure 6:
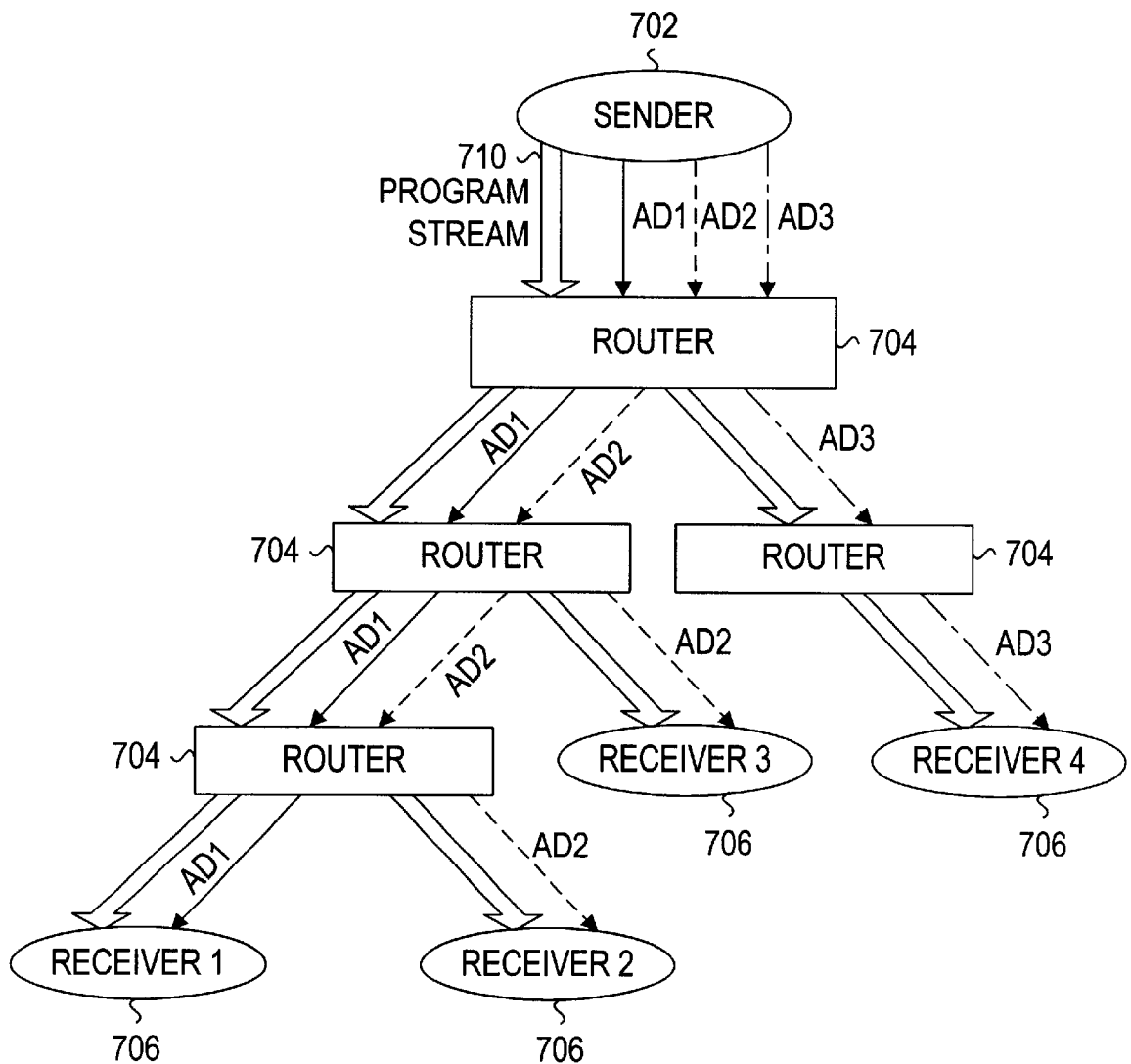
FIG. 6 illustrates an exemplary process of inserting advertisements at a client side.

FIG. 6 illustrates an exemplary process of inserting advertisements at a client side. This insertion scheme is particularly useful for Internet-based services. In the exemplary case of FIG. 6, a program stream 710 is transmitted from a sender 702 to a plurality of receivers 706 via one or more routers 704. The advertisements are simultaneously transmitted from the sender 702 wherein a first advertisement, AD1, is transmitted through a series of routers 704 to receiver 1. A second advertisement, AD2, is transmitted through a series of routers to receivers 2 and 3. A third advertisement, AD3, is transmitted through a series of routers to receiver 4.

Figure 7:
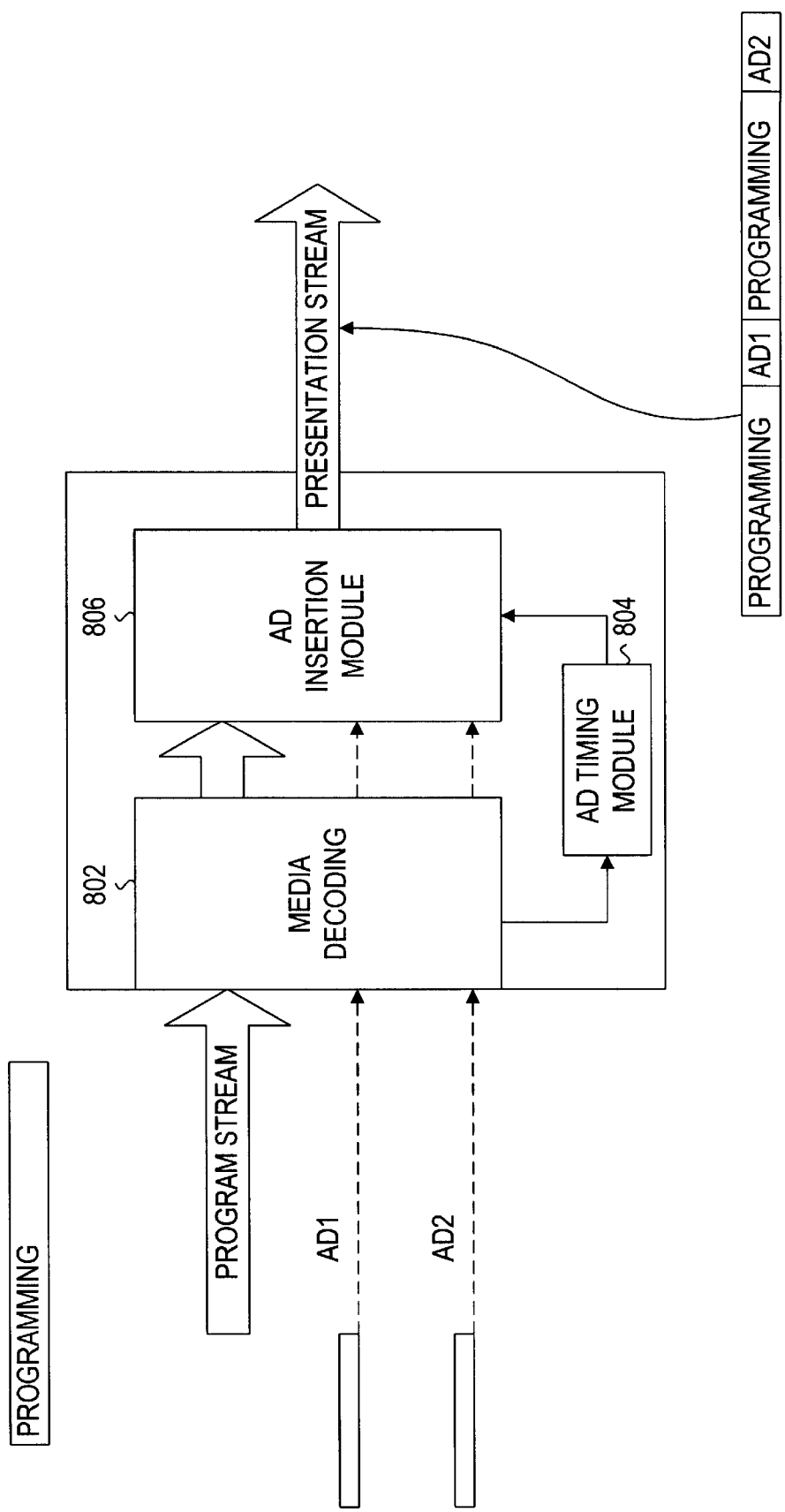
FIG. 7 illustrates another implementation of local insertion of advertisements.

FIG. 7 illustrates another implementation of local insertion of advertisements. This implementation is particularly applicable for cable-based and satellite-based systems. Herein, at a client side, a program stream is received in conjunction with one or more advertisements. A media decoding unit 802 decodes the program stream along with at least one advertisement. An ad timing module 804 determines the point at which an advertisement should be inserted. An ad insertion module 806 inserts the advertisement into the program stream to form a presentation stream that may be presented to the subscriber.

The media decoding module 802, the advertisement timing module (also referred as ad timing module) 804, and the advertisement insertion module (also referred as ad insertion module) 806 may be realized via software means by manipulating associated packets. The software means may also be used to form one or more final presentation streams. In an audio environment, an audio receiving program running on a standard personal computer may be configured to receive a multicast audio program stream and to simultaneously receive one or more advertisements.

One feature of the present invention is that the advertising streams may be received over a channel that has a substantially lower bandwidth than the program stream. This is due to the fact that the advertisement may be received over a relatively long period of time with respect to the actual duration of the advertisement (also referred to as ad) when playback is at normal speed. As an example, an audio program stream may be received at 56 kb/s, while the advertisement may be received over a 14.4 kb/s channel and buffered for insertion.

In an alternative embodiment, a hardware realization may be used for both media decoding and ad insertion. As an example, a video system may receive a program stream which is decoded in a video decoder such as a Motion Picture Expert Group (MPEG) video decoder. The advertisements may be simultaneously received and inserted at the appropriate moment. This can be done in hardware such that the MPEG data stream is decompressed and the ad is inserted at the appropriate time. The presentation stream is then converted to an analog signal and transmitted to a display for viewing by the subscriber.

In one embodiment, the program stream and advertisements are received locally and the advertisements inserted before the programming is decoded. The packets containing the default advertising or programming may be substituted with new packets containing the desired advertisement. The composite signal is a coded or compressed presentation stream containing the new advertisement and may be sent to a decoding unit.

Generally, the insertion of advertisements in program streams is handled by a combination of cue-tone detectors, switching equipment and tape players which hold the advertising material. Upon receipt of the cue tone, an insertion controller automatically turns on a tape player containing the advertisement. Switching equipment then switches the system output from the video and audio signals received from the programming source to the output of the tape player. The tape player remains on for the duration of the advertising, after which the insertion controller causes the switching equipment to switch back to the video and audio channels of the programming source. When switched, these successive program and advertising segments usually feed to a radio-frequency (RF) modulator for delivery to the subscribers.

Many subscriber television systems, such as cable television systems are currently being converted to digital equipment. These new digital systems compress the advertising data, e.g., using MPEG-2 compression, store the compression data as a digital file on a large disk drive or several drives, and then, upon receipt of the cue tone, spool ("play") the file off of the drive to a decompressor. The video and accompanying audio data are decompressed back to a standard video and audio, and switched into the video/audio feed of the RE modulator for delivery to the subscriber.

A program stream, generally, is a collection of video, audio, and data streams which usually share a common time base. To enable the inserting of different advertisements in compressed program streams, different splice points are identified. Splice points in a compressed program stream provide opportunities to switch from one program to another. They generally indicate a safe place to switch from one program to another. They indicate a safe place in the bit stream, where a switch can be made, and result in good visual and audio quality. Unlike uncompressed video, frame boundaries in an MPEG-2 bit stream are not evenly spaced. Therefore, the syntax of the transport packet itself is used to convey where these splice points may occur.

There exists a plurality of standards in the current technologies that provide splice points and other constraints for encoding and inserting in program streams, e.g., MPEG-2 transport streams. In systems utilizing MPEG-2, the transport streams may be spliced without modifying the Packetized Elementary Stream (PES) payload. The systems are in compliance with existing Society of Motion Picture and Television Engineers (SMPTE) standards, e.g., SMPTE 312M-1999, and the constraints specified in the standard are applied individually to program streams within transport streams.

Splicing of MPEG bit streams requires managing buffer fullness of the decoder's buffers. When MPEG bit streams are encoded, there is an inherent buffer occupancy at every point in time. The buffer fullness corresponds to a delay, the amount of time that a byte spends in the buffer. When splicing two separately encoded bit streams, the delay at the splice point will not usually match. This mismatch in delay can cause the buffer to overflow or underflow at some time in the future.

To avoid unpredictable underflows and overflows, the splicing method requires that the MPEG encoder match the delay at splicing points to a given value. Alternatively, the syntax of the transport packet itself may be used to convey where these splicing points may occur.

Two different types of splice points may be defined: Out Points and In Points. In Points are places in the bit streams where it is safe to enter and start decoding that bit stream. Out points are places where it is safe to exit the bit stream. Out Points and In Points are imaginary points in the bit stream located between two transport stream packets. An Out Point and an In Point may be co-located; that is, a single packet boundary may serve as both a safe place to leave a bit stream and a safe place to enter it.

The SMPTE standard describes requirements for grouping In Points of a set of PID streams into program In Points and for grouping Out Points of a set of PID streams into program Outpoints which correspond in presentation time to the underlying data. In MPEG, audio is typically organized into audio frames. Because video and audio frames have different durations and their presentation times do not necessarily align, this standard defines exactly what it means for PID stream splice points to correspond in time. More information on this standard may be found in a document entitled "SMPTE Standard for Television, Splice Points for MPEG-2 Transport Schemes", published by the Society of Motion Picture and Television Engineers, 595 W. Hartsdale Avenue, White Plains, N.Y. 10607.

Thus, one object of the invention is to provide for efficient real-time distribution of one or more variable bit-rate (VBR) programs to one or more receivers. In cases where a plurality of programs are multiplexed together and distributed simultaneously, it is possible, in the context of the present invention, for one or more of these programs to be encoded at a constant bit rate (CBR). Typically, each VBR or CBR program will consist of a video stream component, one or more audio stream components, and possibly one or more data stream components. Each of these real-time distributed programs is hereinafter referred to as primary programs.

It is another object of the invention to selectively distribute advertisements in the form of auxiliary data to one or more receivers. The auxiliary data is distributed in non-real time using any available channel capacity, and is stored locally at the selected receivers for real-time presentation at a later time. In accordance with the foregoing, one aspect of the invention comprises a method and apparatus for efficient CBR distribution of program streams, along with advertisements (auxiliary data) of a general character, to one or more receivers. A primary data stream, comprising at least one VBR program, and possibly one or more CBR programs, is converted to a CBR data stream by inserting auxiliary data where fill packets would have otherwise been used to create a CBR data stream. The distribution of the program streams and advertisements is based on subgroups.

Typically, the auxiliary data may be differentiated from the primary programs in that the auxiliary data need not be distributed in real time. By doing away with the requirement for real-time or near real-time distribution of at least a portion of the program multiplex, it becomes easier to efficiently utilize the available channel bandwidth. Once the real-time component of the multiplex has been formed using prior art techniques, the remaining channel bandwidth can be used to accommodate the non-real time component. In this way, it becomes possible to attain 100% channel utilization as long as there exists some non-real data in the queue awaiting distribution. Thus, the CBR distribution data stream is created, and data transmission capacity is increased, by the insertion of auxiliary data in space that would otherwise be wasted.

In an exemplary embodiment of this aspect of the invention, the packets of auxiliary data are inserted in between the packets of the primary programs whenever the distribution channel is idle for a time interval that is at least as long as the time interval needed to transmit the next packet of auxiliary data. In addition, MPEG-compliant program map data illustrating the location of each of the primary program or auxiliary data stream components in the multiplexed data stream are inserted into the data stream for use at the receivers. Such program maps are described in .sctn.2.4.4 of the MPEG system layer documentation, ISO/IEC 13818-1.

In connection with the foregoing, another aspect of the invention comprises a method and apparatus for receiving the CBR distribution data stream at a particular receiver, and combining selected program streams with selected advertisements to create a customized augmented program for that particular receiver. The receiver is configured with sufficient local storage to buffer the selected advertisements until they are needed, for insertion into the selected primary program or for other presentations, at a later time.

In an exemplary embodiment of this aspect of the invention, a receiver program selector receives the distribution data stream and uses a program map embedded therein to direct program and auxiliary data multiplexers (MUXes) to extract a selected primary program and selected portions of the auxiliary data stream, respectively. A video augmentation unit then inserts the selected auxiliary data into the primary program stream to create an augmented primary program which is supplied for decoding and viewing. In the typical case, the auxiliary data comprises short program segments including both video and audio data.

In this way, individual receivers which include some form of local storage could be programmed to receive certain program segments or certain types of program segments at any time of the day. For example, all new car advertisements could be classified together and assigned a unique group identification number. If such advertisements are periodically extracted from an auxiliary data library and combined with the multiplexed primary programs prior to distribution, then the program map embedded in the distribution data stream would be updated to reflect such additions.

For example, a receiver that has been programmed to receive all advertisements pertaining to new automobiles, and which is monitoring the received bit stream could detect such an advertisement by matching the relevant group classification number in the embedded program table with an internal list representative of the types of programs which it has been programmed to receive. The PIDs corresponding to any associated audio, video, or data streams comprising the advertisement, could then be extracted from the distribution data stream and copied to local storage for viewing at a later time.

In an alternative embodiment of the invention, the selected auxiliary data need not be combined with a primary program, but can be maintained separately for independent presentation as in the case of non-video data. For example, the new car advertising mentioned above could take the form of brochures to be printed on a receiver's printer or an interactive computer demo to be displayed on his computer.

Figure 8:
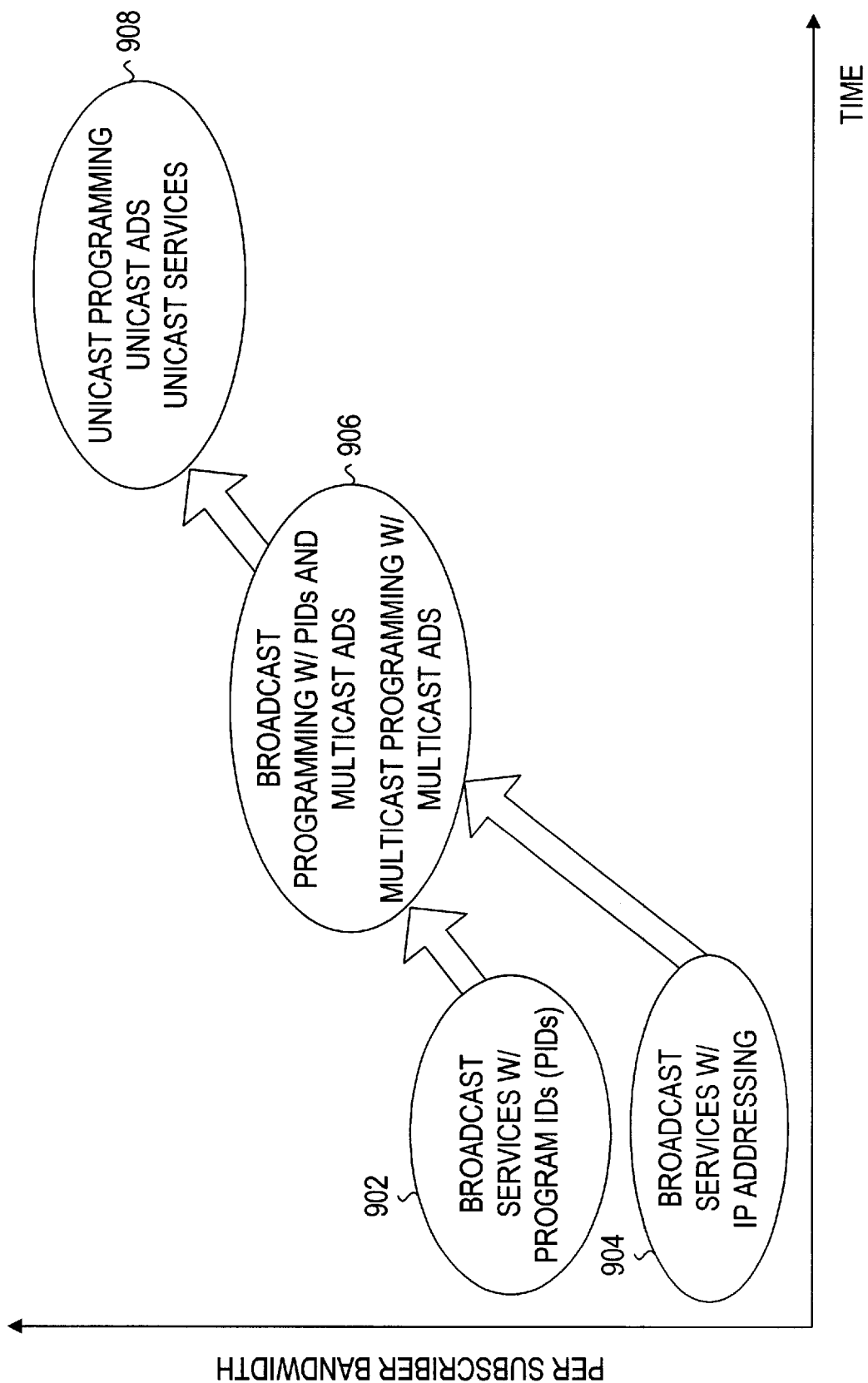
FIG. 8 illustrates the migration of advertising from broadcast advertisements or advertisements in unicast IP addressed streams to multicast ads and services, and to unicast ad and unicast services.

FIG. 8 illustrates the migration of services from the present suite of services that are transmitted as broadcast services with program IDs (PIDs) 902 and broadcast services with IP addressing 904, to medium bandwidth services 906 which can include broadcast programming labeled by program identifiers and combined with multicast advertisements, as well as multicast programming with multicast ads. Also illustrated in FIG. 8 is the migration from medium bandwidth services 906 to unicast services 908 including unicast programming and unicast ads. In unicast services, the individual advertisements are delivered directly to the subscriber along with the individually selected programming.

FIG. 9 illustrates MPEG multicast and Internet multicast ad insertion tables. As shown in FIG. 9, the program identifier (PID) which identifies a program stream is associated with a presentation stream ID (PS ID) or a node ID (NODE ID) and an advertisement ID (AD ID). The table of FIG. 9 helps in determining which advertisements (ads) should be directed to which nodes or program streams. If required, as in the cases of local insertion, an ad insert times may also be included. The ad insert times indicate the times at which the ads should be inserted in the corresponding program streams.

In FIG. 10, the subscriber IP addresses are shown and are associated with program multicast addresses and ad multicast addresses. This table indicates which multicast subgroups should be formed and which advertisements should be inserted. Thus, all subscribers can receive the same program multicast but can receive different ad multicasts as determined by the associations in the table.

For example, a combination of the MPEG program ID and multicast addressing schemes can be used in which MPEG programming ID streams and presentation stream or node IDs have ad multicast addresses associated with them. This technique can be used when out-of-band ads are transmitted to cable television set-tops over a cable modem channel. The advertisements are directed according to the advertisement multicast addresses, while programming is delivered via traditional cable television channels. The local insertion technique may be used to match the program ID with the ad multicast.

The advertisements may be inserted into program streams to create a plurality of presentation streams that are directly transmitted to a group of subscribers. An example of this embodiment is the substitution of advertisements in a cable television system at the cable TV head end and transmission of the new program presentation stream directly to the subscriber. In another embodiment, an Internet sender inserts ads destined for a subgroup multicast and multicasts the new presentation stream to the subscribers in that multicast subgroup.

An alternate form of in-band transmission used to transmit advertisements within a cable television system is the digital multiplexed signal that forms a 27 Mb/s digital cable channel containing multiple program streams. The multiplexed signal may comprise a digital payload containing a plurality of programs/channels. One of the channels within the multiplexed signal may contain one or more target advertisements instead of traditional programming. These advertisements, when received at the subscriber side, may be inserted at the appropriate moment using subscriber side ad insertion.

The advertisements may be transmitted in an in-band channel at a lower rate than their viewing rate, and are stored and played back at the appropriate moment. The advertisements may also be transmitted via a channel that is out of band relative to the original program stream. In the out-of-band transmission techniques, the advertisements are transmitted in a channel that is separate from the programming channel. In one embodiment, the out-of-band advertisement transmission occurs in an Internet audio system wherein the programming is transmitted on one multicast channel to a first group of subscribers, and one or more advertisements are transmitted on a second multicast channel to a second group of subscribers.

In another embodiment, the out-of-band transmission of advertisements is accomplished by using a cable television data channel such as a DOCSIS cable modem channel. In this embodiment, the advertisements are transmitted to the subscriber in an out-of-band channel that is separate from the video programming channel. The ads are inserted into a presentation stream in a set-top or in a computer, and are displayed to the subscriber on the television or computer screen. The ability to transmit data on a channel that is separate from the television programming channel is well known to those skilled in the art. Technical specifications for cable modems are provided in the CableLabs Data Over Cable Service Interface Specification (DOCSIS) available at http://www.cablemodem.com/public/pubtech.html which are incorporated herein by reference.

Generally, the programming or entertainment program streams include digital video or audio streams that contain programming of interest to the subscriber. This programming may be entertainment programming in the form of shows, news, theatre, and movies, or may be data programming including but not limited to stock quotes, travel information, or other types of information that may be broadcasted to a plurality of subscribers.

Generally, the program streams are digitized and compressed in order to be transmitted over a limited bandwidth channel. A variety of compression schemes may be used. For video, these techniques include the motion pictures expert group (MPEG) compression standard, as well as any of the video streaming standards used for the transmission of video over the Internet. For audio systems, a variety of audio compression and transmission techniques may be used including the compression and transmission system developed by Real Networks and sold under the trademark REALAUDIO, as well as other audio compression and transmission systems available for use on the Internet. These video and audio compression and transmission systems allow for the incorporation of some generic/default advertisements when initially placed in the digital audio or video streams. Once placed in the stream, a variety of techniques may be used to detect their presence. In one embodiment, at a local insertion point, these generic/default advertisements are substituted with one or more targeted advertisements that are more suitable to the needs/preferences of the subscriber. Alternatively, the audio or video digital streams may contain one or more empty segments that are detectable by advertising breaks, and one or more target advertisements are inserted in these ad breaks.

One technique that may be used to detect an advertisement break in the compressed digital stream is the placement of an audible or inaudible tone within the digital stream. This tone may be used to mark the beginning or end of the advertisement. An alternate technique is to place a known digital code in the audio or video stream that permits recognition of the advertisement. This code may indicate the duration of the advertisement. Using this technique, digital circuitry may be used to recognize the beginning of the advertisement. Other techniques are also envisioned.

Once the advertisement is located and removed from the audio or video stream, it may be necessary to "heal" the stream such that there is no disruption in the compression algorithms which may rely on information which is interspersed in the advertisement. The interspersing of information may be such that programming information is included in a digitized advertisement which will be replaced. A healing technique may be used to replace the original audio or video information and inserted ad, and consists of locating the information in the stream which is related to the programming and insuring that it is contained within the new advertisement that is inserted into the programming.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A method for simultaneously transmitting different targeted advertisements within programming to different subgroups in a telecommunications system, the method comprising:
   receiving a program stream that is some combination of a video stream and an audio stream;
   receiving a plurality of advertisement streams, each advertisement stream being some combination of a video stream and an audio stream;
   inserting a first advertisement stream in the program stream to create a first presentation stream and a second advertisement stream in the program stream to create a second presentation stream;
   simultaneously transmitting the first presentation to a first subgroup and the second presentation stream to a second subgroup.

2. The method of claim 1, further comprising forming a plurality of subgroups including at least the first subgroup and the second subgroup.

3. The method of claim 2, wherein said forming includes forming the subgroups using multicast addresses.

4. The method of claim 2, wherein said forming includes forming the subgroups using Internet multicasting protocol.

5. The method of claim 2, wherein said forming includes forming the subgroups based on cable nodes.

6. The method of claim 2, wherein said forming includes forming the subgroups based on routers.

7. The method of claim 2, wherein said forming includes forming the subgroups according to market segments.

8. The method of claim 2, wherein said forming includes forming the subgroups according to subscriber characteristics.

9. The method of claim 8, wherein the subscriber characteristics include at least some subset of geographic attributes, demographic attributes, psychographic attributes, and product and brand usage attributes.

10. The method of claim 1, wherein the program stream includes programming and one or more pre-configured advertisements.

11. The method of claim 10, wherein said inserting includes inserting the advertisement streams in place of some subset of the one or more pre-configured advertisements.

12. The method of claim 1, wherein the program stream includes programming and one or more empty segments.

13. The method of claim 12, wherein said inserting includes inserting the advertisement streams in place of some subset of the one or more empty segments.

14. The method of claim 1, wherein said inserting includes inserting the advertisement streams in real-time.

15. The method of claim 1, wherein
   said receiving a program stream includes receiving n program streams;
   said receiving a plurality of advertisement streams includes receiving m advertisement streams; and
   said inserting includes inserting at least some subset of the m advertisements streams in at least some subset of n program streams to create p presentation streams, where p is greater than n.

16. The method of claim 1, wherein said simultaneously transmitting is accomplished by transmitting the presentation streams as cable television channels.

17. The method of claim 1, wherein said simultaneously transmitting is accomplished by transmitting the presentation streams as streaming video channels.

18. The method of claim 1, wherein said simultaneously transmitting includes transmitting the presentation streams as audio channels.

19. The method of claim 1, wherein said simultaneously transmitting includes transmitting the presentation streams as broadcast channels.

20. The method of claim 1, wherein said simultaneously transmitting includes transmitting the presentation streams as satellite channels.

21. The method of claim 1, wherein at least some subset of the program streams, the advertisement streams, and the presentations streams are digital signals.

22. The method of claim 2, further comprising:
   assigning a subgroup address to each subgroup;
   assigning an advertisement identifier to each of the advertisement streams; and
   creating a relationship between the subgroup addresses and the advertising identifiers.

23. The method of claim 22, wherein the advertisements are inserted into the program stream based on the relationship.

24. A system for simultaneously transmitting different targeted advertisements within programming to different subgroups in a telecommunications system, the system comprising:

means for receiving a program stream that is some combination of a video stream and an audio stream;

means for receiving a plurality of advertisement streams, each advertisement stream being some combination of a video stream and an audio stream;

means for inserting a first advertisement stream in the program stream to create a first presentation stream;

means for inserting a second advertisement stream in the program stream to create a second presentation stream;

means for simultaneously transmitting the first presentation to a first subgroup and the second presentation stream to a second subgroup.

25. The system of claim 24, further comprising:

means for assigning a subgroup address to each subgroup;

means for assigning an advertisement identifier to each of the advertisement streams; and means for creating a relationship between the subgroup addresses and the advertising identifiers.

26. The system of claim 25, further comprising means for selecting the advertisements to be inserted into the program stream responsive to said means for creating a relationship.

27. A computer program embodied on a computer readable medium for simultaneously transmitting different targeted advertisements within programming to different subgroups in a telecommunications system, the computer program comprising:

a source code segment for receiving a program stream that is some combination of a video stream and an audio stream;

a source code segment for receiving a plurality of advertisement streams, each advertisement stream being some combination of a video stream and an audio stream;

a source code segment for inserting a first advertisement stream in the program stream to create a first presentation stream;

a source code segment for inserting a second advertisement stream in the program stream to create a second presentation stream;

a source code segment for simultaneously transmitting the first presentation to a first subgroup and the second presentation stream to a second subgroup.

28. The computer program of claim 27, further comprising:

means for assigning a subgroup address to each subgroup;

means for assigning an advertisement identifier to each of the advertisement streams; and means for creating a relationship between the subgroup addresses and the advertising identifiers.

29. The computer program of claim 28, further comprising a source code segment for selecting the advertisements to be inserted into the program stream responsive to said source code segment for creating a relationship.

30. A method for creating multiple presentation streams having the same programming and different advertising and transmitting the presentation streams to different subgroups in a telecommunications system, the method comprising:

creating at least one subgroup within the telecommunication stream;

receiving a first presentation stream including programming and advertisements;

receiving at least one advertisement stream, wherein the at least one advertisement stream;

selecting at least one targeted advertisement stream from the at least one advertisement stream for targeting to the at least one subgroup;

inserting the at least one targeted advertisement stream in place of at least one advertisement in the first presentation stream to create a second presentation stream;

simultaneously transmitting the first presentation stream and the second presentation stream.

31. The method of claim 30, wherein the first presentation stream and the at least one advertisement stream are at least some combination of a video stream and an audio stream.

32. A system for creating multiple presentation streams having the same programming and different advertising and transmitting the presentation streams to different subgroups in a telecommunications system, the system comprising:

a receiver for receiving programming streams and advertisement streams;

a storage medium capable of storing the programming streams, the advertisement streams and identification of at least one subgroup within the telecommunication system;

an advertisement insertion module for inserting at least one advertisement stream in place of an advertisement within at least one programming stream to create at least one presentation stream;

a transmitter for simultaneously transmitting the at least one programming stream and the at least one presentation stream and the second presentation stream.

33. The system of claim 32, wherein the first programming streams and the advertisement streams are at least some combination of video streams and audio streams.

34. The system of claim 32, further comprising a processor for selecting the advertisement streams to insert in the program streams.

35. The system of claim 34, wherein said processor selects the advertisement streams by matching characteristics about the advertisements with characteristics about the subgroups.

36. The system of claim 35, wherein the characteristics include at least some subset of geographic attributes, demographic attributes, psychographic attributes, and product and brand usage attributes.

37. The system of claim 34, wherein said processor also defines the subgroups within the telecommunication system.

38. The system of claim 37, wherein said processor can define subgroups according to at least some subset of regional head-end, local head-end, node, router, set-top box, and IP address.

* * * * *

UNITED STATES PATENT AND TRADEMARK OFFICE
CERTIFICATE OF CORRECTION

PATENT NO.     : 6,615,039 B1
DATED          : September 2, 2003
INVENTOR(S)    : Charles A. Eldering It is certified that error appears in the above-identified patent and that said Letters Patent is hereby corrected as shown below:

Column 8,
Line 65, delete "RE" and replace with -- RF --.

Signed and Sealed this

Ninth Day of December, 2003

JAMES E. ROGAN
*Director of the United States Patent and Trademark Office*

UNITED STATES PATENT AND TRADEMARK OFFICE
CERTIFICATE OF CORRECTION

| | | |
|---|---|---|
| PATENT NO. | : 6,615,039 B1 | Page 1 of 1 |
| APPLICATION NO. | : 09/568477 | |
| DATED | : September 2, 2003 | |
| INVENTOR(S) | : Charles Eldering | |

It is certified that error appears in the above-identified patent and that said Letters Patent is hereby corrected as shown below:

On the title page item (57), Abstract, Line 12, delete "m" and replace with --n--;

Column 12, line 31-32, delete "out-of-band" and replace with --out of band--.

Signed and Sealed this

Twentieth Day of February, 2007

JON W. DUDAS
*Director of the United States Patent and Trademark Office*